United States Patent
Whitman

(10) Patent No.: US 9,547,679 B2
(45) Date of Patent: *Jan. 17, 2017

(54) DEMOGRAPHIC AND MEDIA PREFERENCE PREDICTION USING MEDIA CONTENT DATA ANALYSIS

(71) Applicant: The Echo Nest Corporation, Somerville, MA (US)

(72) Inventor: Brian Whitman, Cambridge, MA (US)

(73) Assignee: SPOTIFY AB, Stockholm (SE)

(*) Notice: Subject to any disclaimer, the term of this patent is extended or adjusted under 35 U.S.C. 154(b) by 217 days.

This patent is subject to a terminal disclaimer.

(21) Appl. No.: 13/849,167

(22) Filed: Mar. 22, 2013

(65) Prior Publication Data

US 2013/0262469 A1    Oct. 3, 2013

Related U.S. Application Data

(60) Provisional application No. 61/617,553, filed on Mar. 29, 2012.

(51) Int. Cl.
*G06F 7/00* (2006.01)
*G06F 17/30* (2006.01)
*G06Q 30/02* (2012.01)

(52) U.S. Cl.
CPC ... *G06F 17/30324* (2013.01); *G06F 17/30029* (2013.01); *G06F 17/30867* (2013.01); *G06Q 30/02* (2013.01)

(58) Field of Classification Search
CPC .................. G06F 17/30321; G06F 17/30029; G06F 17/30867; G06Q 30/02

(Continued)

(56) References Cited

U.S. PATENT DOCUMENTS 4,606,002 A    8/1986 Waisman et al.
5,577,249 A    11/1996 Califano
(Continued)

FOREIGN PATENT DOCUMENTS

CA    2 253 744 A1    5/2000
EP    1 675 020 A2    6/2006
(Continued)

OTHER PUBLICATIONS

Int'l Search Report and Written Opinion of the Int'l Searching Authority for Int'l Pat. Appl'n No. PCT/US2013/034127, May 8, 2013, (10 pages).

(Continued)

*Primary Examiner* — Md. I Uddin
(74) *Attorney, Agent, or Firm* — Fitzpatrick, Cella, Harper & Scinto

(57) ABSTRACT

Methods, systems and computer program products are provided for predicting data. A name or title is obtained from a taste profile. There is an index into a data set based on the name or title, and a set of terms and corresponding term weights associated with the name or title are retrieved. A sparse vector is constructed based on the set of terms and term weights. The sparse vector is input to a training model including target data. The target data includes a subset of test data which has a correspondence to a predetermined target metric of data. A respective binary value and confidence level is output for each term, corresponding to an association between the term and the target metric.

19 Claims, 7 Drawing Sheets

(58) Field of Classification Search
USPC .......................................... 707/741, 742, 769
See application file for complete search history.

(56) References Cited

U.S. PATENT DOCUMENTS

| | | | |
|---|---|---|---|
| 5,799,184 | A | 8/1998 | Fulton et al. |
| 7,772,478 | B2 | 8/2010 | Whitman et al. |
| 8,050,921 | B2 | 11/2011 | Mark et al. |
| 2005/0097121 | A1 | 5/2005 | Sally et al. |
| 2008/0005651 | A1 | 1/2008 | Grefenstette et al. |
| 2008/0059461 | A1 | 3/2008 | Brock et al. ..................... 707/6 |
| 2008/0071519 | A1 | 3/2008 | Brun et al. ..................... 704/9 |
| 2008/0147711 | A1 | 6/2008 | Spiegelman et al. ......... 707/102 |
| 2009/0292660 | A1 | 11/2009 | Behal et al. |
| 2009/0319500 | A1 | 12/2009 | Agrawal et al. ................. 707/4 |
| 2009/0327249 | A1 | 12/2009 | Pappas |
| 2010/0161623 | A1 | 6/2010 | Torbjornsen |
| 2010/0191689 | A1* | 7/2010 | Cortes et al. .................. 706/46 |
| 2010/0293179 | A1 | 11/2010 | Chaudhuri et al. |
| 2010/0313258 | A1 | 12/2010 | Chaudhuri et al. ............. 726/9 |
| 2011/0282856 | A1 | 11/2011 | Ganti et al. |
| 2012/0036130 | A1 | 2/2012 | Light et al. |
| 2012/0041969 | A1 | 2/2012 | Priyadarshan et al. |
| 2012/0110071 | A1 | 5/2012 | Zhou et al. |
| 2012/0123854 | A1* | 5/2012 | Anderson .............. G06Q 30/02 705/14.43 |
| 2012/0278341 | A1* | 11/2012 | ogilvy ................... G06Q 10/00 707/749 |
| 2013/0262089 | A1 | 10/2013 | Whitman et al. |
| 2013/0262471 | A1 | 10/2013 | Whitman et al. |
| 2014/0046945 | A1* | 2/2014 | Deolalikar .......... G06F 17/3071 707/737 |

FOREIGN PATENT DOCUMENTS

| | | |
|---|---|---|
| WO | 2010087909 A1 | 8/2010 |
| WO | WO 2010/087909 A1 | 8/2010 |
| WO | 2011032069 A2 | 3/2011 |

OTHER PUBLICATIONS

Int'l Search Report and Written Opinion of the Int'l Searching Authority for Int'l Pat. Appl'n No. PCT/US2013/034132, Jun. 6, 2013, (13 pages).

Int'l Search Report and Written Opinion of the Int'l Searching Authority for Int'l Pat. Appl'n No. PCT/US2013/034130, Jun. 26, 2013 (10 pages).

Int'l Search Report and Written Opinion of the Int'l Searching Authority, PCT/US2014/025532, Jul. 11, 2014.

* cited by examiner

301

| Music Taste Record | | | |
|---|---|---|---|
| TPID | Artist ID | Play# | ... |
| CA1234 | AR1234 | 7 | |

Inverted Indices

AR1234 → [f3x89, f4x96,...]
Sexy ——— → [f2x01, f3x89,...]
Beyonce → [f3x89]

DEMOGRAPHIC AND MEDIA PREFERENCE PREDICTION USING MEDIA CONTENT DATA ANALYSIS

CROSS-REFERENCE TO RELATED APPLICATION

This application claims priority to U.S. Provisional Application No. 61/617,553, filed Mar. 29, 2012, the contents of which are incorporated herein by reference.

BACKGROUND

I. Field

Example aspects of the present invention generally relate to predicting demographics and/or taste preferences from music or other media data.

II. Related Art

In business communications, it is useful to direct communications to specific groups of recipients. For example, an advertiser may wish to direct targeted advertisements to customers whose demographics (male, elderly, etc.) indicate that they are more receptive to such advertisements. To that end, it is helpful to identify demographics of customers or other recipients from available source data.

However, existing approaches tend to rely on a relatively small set of source data, such as a web browsing history. Such approaches generally lead to predictions which have less accuracy than desired.

BRIEF DESCRIPTION

The example embodiments described herein address the above-identified needs by providing methods, systems and computer program products for predicting data. A name or title is obtained from a taste profile. There is an index into a data set based on the name or title, and a set of terms and corresponding term weights associated with the name or title are retrieved. A sparse vector is constructed based on the set of terms and term weights. The sparse vector is input to a training model including target data. The target data includes a subset of test data which has a correspondence to a predetermined target metric of data (e.g., demographic data). A respective binary value and confidence level is output for each term, corresponding to an association between the term and the target metric.

BRIEF DESCRIPTION OF THE DRAWINGS

The features and advantages of the example embodiments of the invention presented herein will become more apparent from the detailed description set forth below when taken in conjunction with the following drawings.

FIG. 3 illustrates a representative view of a taste profile according to an example embodiment.

FIG. 4 depicts a representative view of inverted indices for terms associated with musical data according to an example embodiment.

DETAILED DESCRIPTION

The example embodiments of the invention presented herein are directed to methods, systems and computer program products for predicting demographic data. This description is not intended to limit the application of the example embodiments presented herein. In fact, after reading the following description, it will be apparent to one skilled in the relevant art(s) how to implement the following example embodiments in alternative embodiments, such as such as a services-based environment, a web media-based environment, etc.

Figure 1:
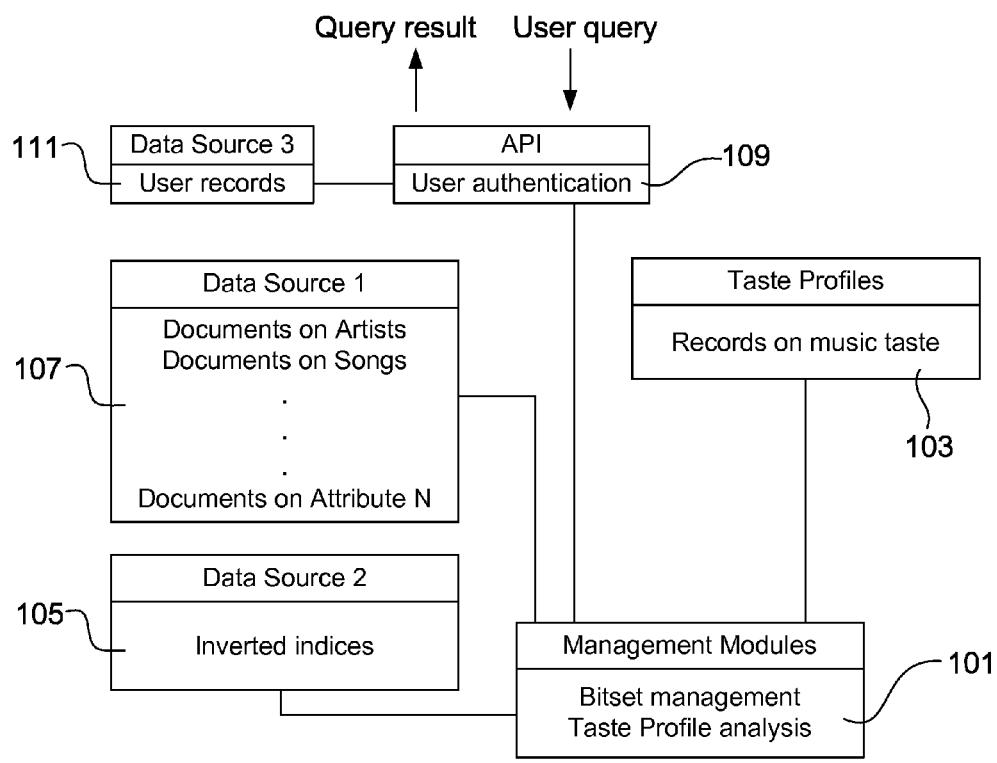
FIG. 1 is a representative view of a system in which some embodiments of the invention may be implemented.

FIG. 1 illustrates a representative view of a system in which some embodiments of the invention may be implemented. The environment comprises several modules, which may be embodied as, for example, computer hardware elements executing software, as described below with respect to FIG. 7.

As shown in FIG. 1, the system includes management modules 101, which control processing including taste profile analysis. In response to a query, management modules 101 retrieve terms and weights associated with an artist, song title, or other preference of a user, and use the terms and weights to predict demographic data or other taste preferences, as described more fully below.

Taste profiles 103 contains records indicating the music taste (or other tastes) of users. In one example embodiment, each taste profile is a representation of musical activity, and may include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc. Further details of the taste profile are described below with respect to FIG. 3.

Data source 105 contains records as inverted indices in which terms are indexes to documents for artist names or song titles. For example, the terms "Sexy", "R&B", and "Dance" might index to a document for artist "Beyonce", as described more fully below with respect to FIG. 4. Of course, records can be implemented in any other way that allows fast retrieval of desired information.

Figure 2:
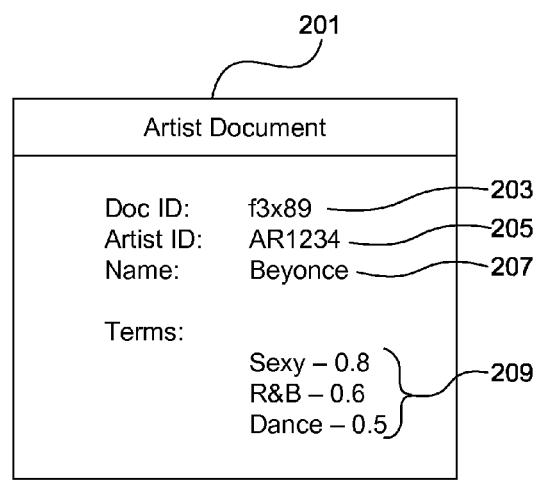
FIG. 2 illustrates a representative view of a set of musical data for an artist according to an example embodiment.

Data source 107 is a data set which contains (1) documents over various domains, such as artists and titles, and (2) terms and weights associated with each artist and/or each title. FIG. 2 illustrates an example document 201 according to such a data set. The document 201 contains a document ID 203 which uniquely identifies the document. In one embodiment, the domain concerns musical artists. In accordance with such a domain, document 201 contains an artist ID 205, an artist name 207, and a list of descriptions 209 related to a subject of the domain under consideration, in this case the artist. Each description is a term-weight pair, where the term describes the subject and the weight indicates how closely the term describes the subject. Data source 107 may store a wide range of terms associated with each artist name or song title, and may be updated at regular intervals, e.g., once per week or month.

For example, one example embodiment might include a data set including over 10,000 terms for each artist from various sources of data about music (or other media such as books, movies or games), along with associated weights. The terms may be weighted based on how important, how often mentioned or how closely related the term is to the artist. The terms may contain information about location, genre, style, marketing classifications, sales predictions, reviews, chat room dialogue transcriptions, biographies, recent news articles, time-dependent popularity and familiarity data, cultural analysis data, and the like. For example, the artist "Beyonce" might be associated with a vector of terms including "R&B", "sexy", "dance", etc., with corresponding weights of 0.8, 0.6 and 0.5. In another example, "Aphex Twin" might be represented not by a single entity, but rather by a vector of terms with probabilities, e.g., ["idm":0.9, "glitch":0.5, "hardcore":0.2], etc. Additional information regarding generation of terms and weights can be found in U.S. Pat. No. 7,772,478, entitled "Understanding Music", the contents of which are incorporated by reference herein. By utilizing a larger amount of data associated with the artist or song names, it is possible to predict demographics and/or taste preferences more accurately than just using a single attribute such as the song title alone. Put another way, the usage of a song, artist, movie, etc. in a taste profile to determine predictive qualities can be enhanced by expanding these media items into descriptive terms and using those terms as the inputs to the predictive model.

API 109 is an application programming interface used to communicate with a client device to receive or transmit information. For example, API 109 receives a query seeking a prediction of demographic data, and returns a query result. To that end, API 109 may perform user authentication or other user-related activities. In addition, API 109 may present a user interface to a client device or interact with a client device to receive input and display output.

User database 111 contains records having identification information of users. In this example, "user" may correspond to a customer such as an advertising entity who submits a query via a client device regarding which demographics are associated with particular musical tastes. On the other hand, "user" may also correspond to a person or group whose musical tastes are being examined, as described more fully below. In either case, a user may or may not be required to register and/or input other data to the database.

FIG. 3 illustrates an entry in taste profiles 103, which contains records indicating user musical (or other) tastes. In one example embodiment, a taste profile is a representation of musical activity, and includes a wide range of information such as artist plays, song plays, skips, ratings by the user, date of listen by the user, songs per day, playlists, play counts, start/stop/skip data for portions of a song or album, contents of collections, user rankings, preferences, or mentions, etc. Thus, the taste profile data includes, in addition to an artist name or a song title, one or more of the following: length of listening activity for a song, length of listening activity for an album, and user actions during song or album play, such as fast forwarding, track skipping, stopping or pausing the song, or other media plays, such as websites visited, book titles, movies watched, playing activity during a movie or other presentations, ratings, or terms corresponding to the media, such as "comedy", "sexy", etc.

A taste profile can represent a single user or multiple users. Conversely, a single user or entity can have multiple taste profiles. For example, one taste profile could be generated in connection with a user's song play activity, whereas another separate taste profile could be generated for the same user based the user's selection of songs/artists for a playlist.

In addition, taste profile data can also contain third party data about users (anonymous or otherwise) via the use of key-value information. For example, social media sites can be examined to create anonymous users and anonymous taste profiles based on mentions of a song title or an artist. In another example, a third-party audio streaming service can update taste profiles based on song "events", such as streaming of a new song.

Users or entities need not be aware what the taste profile is being used for. For example, statistics in a taste profile can be used with statistics from other taste profiles to predict demographic groups corresponding to song plays, without requiring any active submission from a user or client device regarding the user's demographics. Moreover, publicly available data can be included in the taste profile, providing an additional source of easily obtained data which can be used for more robust predictions.

An artist name or song title in a taste profile may be resolved from multiple different textual representations in a taste profile. For example, an artist or song might be commonly represented by multiple nicknames, abbreviations, formats, misspellings, aliases, and the like. Accordingly, the system may take raw text which might include these abnormalities and resolve them to a formal artist or song title. Such resolution could be performed in a server performing other aspects of the invention, or could be performed off-site in another device.

In addition, priority or preference values for a particular song or artist can be stored in the taste profile and can be weighted more heavily if, for example, an artists or song is listened to more frequently, or if a user has identified favorite artists or songs.

While the disclosure refers mainly to using musical data such as artist name or song title for purposes of clarity, it should be understood that the disclosure is not limited thereto. In particular, demographic data could be predicted based on another media preference (e.g., book, movie or game preference) instead of musical data. For example, mentions from social media networks, user settings, playlists or favorites lists can be obtained by crawling or mining this information from the web or other user data to determine preferences related to types of content other than music, for example, book, movie or game titles. Thus, according to the invention, the data set and corresponding terms and weights can be one of a musical data set, a book data set, a movie data set, a game data set, or some combination thereof.

In one embodiment, user preference data is independent of a taste profile, and is simply be gathered based on generic data analysis (e.g., number of mentions, etc.). Thus, in such an embodiment, a prediction is based on the book, movie or game data.

In one example, the taste profile database 103 is updated continuously. For example, a record is added when a user listens to a new song, and the record is updated when an update of the user preference for the song is received via a client device. In one embodiment, the information received from the client device is stored in the database, the correct "matched" metadata is added, and a play count is initialized. For example, a taste profile update with "Britney Spears—Oops" gets resolved to the actual song ID and metadata for "Britney Spears" and "Oops, I Did It Again", with a play count of 1. If a fingerprint code (e.g., an audio fingerprint code) is sent to initialize a taste profile item, the system can resolve the fingerprint code to metadata and discard the fingerprint code.

Referring back to FIG. 1, taste profiles 103 contains records indicating the music taste (or other tastes) of users.

Each taste profile is a representation of musical activity, and may include a wide range of information. Taste profiles 103 can be implemented as one or more relational databases or in any other way that allows fast query processing and scaling.

Returning to FIG. 3, a record 301 in taste profiles 103 contains a taste profile ID 303 corresponding to a user. The record 301 may further contain various fields identifying a song, such as an artist ID 305 identifying the performer of the song, a play count 307, and an album number or track number identifying the medium of the song (not shown). In addition, the record 301 may contain various fields indicating a user's affinity for the song, such as a play count 307 and a review.

Each record 301 in the taste profile is used to produce, for each taste profile ID 303, a list of terms, where the length of the list generally ranges between 1 and 100,000. Each record 301 can be implemented as a covering index residing in RAM for fast random access by management modules 101.

Referring to FIGS. 1 and 4, FIG. 4 illustrates a representative view of inverted indices stored in data source 105, which is an index database containing records as inverted indices in which terms are indexes to documents. Of course, records can be implemented in any other way that allows fast retrieval of desired information. An inverted index 403 can be generated for any term that appears in the documents in the document database 107. The term is then mapped to the list of documents that contain the term. The inverted indices in data source 105 allow the artists, songs or other subjects in music domains that might be associated with terms corresponding to a user's music experience to be identified quickly.

As discussed above, the system also contains an application programming interface (API) 109. Functionally, the API 109 takes a request from a client device, and authenticates users included in the request against the user database 111. Upon successful authentication, the request is passed to the management module 101. After the management module 101 performs processing to fulfill the request and sends the processing result back to the network, the API 109 outputs the processing result to the client device.

Other databases (not shown) may be communicatively linked to management modules 101. Such additional databases may store music requests each corresponding to one or more users, each representing a list of documents over a specific domain that is associated with specific users. Still other databases may contain records mapping a user to the list of records in the taste profile database 103.

As described more fully below, a wide range of terms and weights associated with each artist or song can be accessed in connection with a wide range of data in the taste profiles. This combination provides for a more robust prediction of demographic data from the taste profile data.

Figure 5:
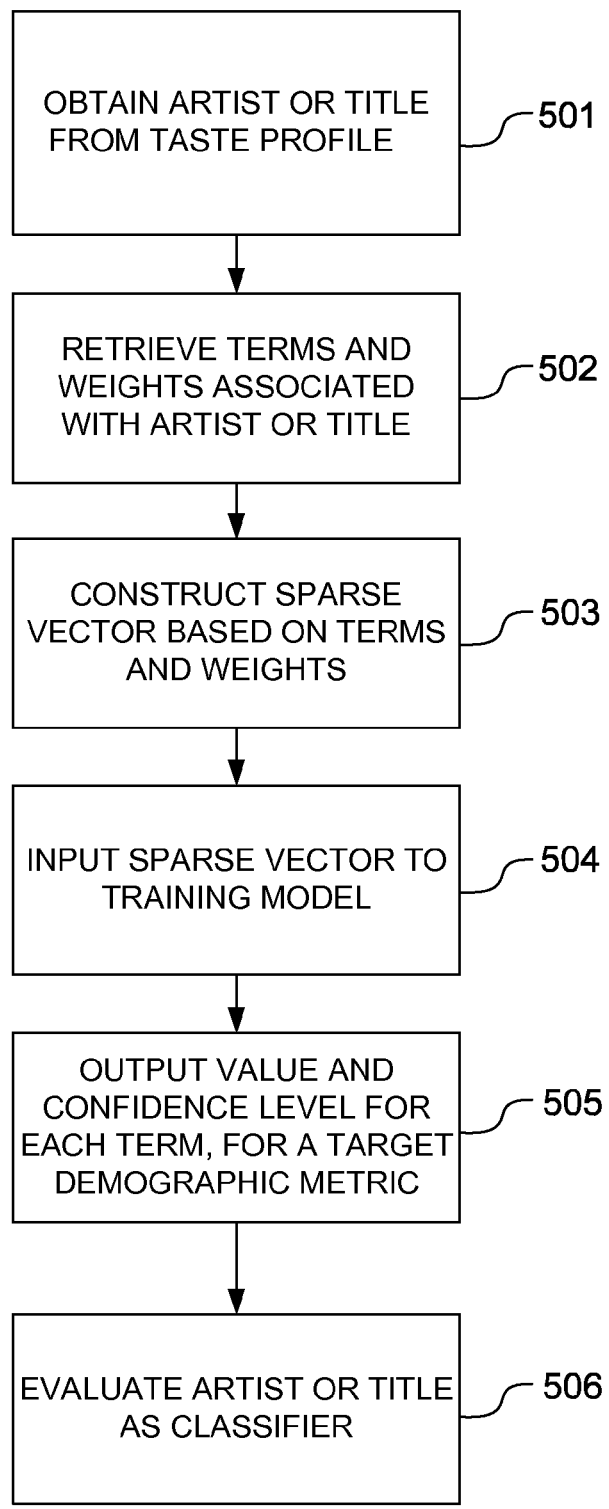
FIG. 5 is a flowchart diagram showing an exemplary procedure for predicting demographic data.

FIG. 5 is a flowchart diagram showing an exemplary procedure for predicting data. Generally, this exemplary embodiment predicts demographic data from a wide range of information corresponding to the artist or song title. A name or title is obtained from a taste profile. An index into a data set is included, which is based on the name or title. A set of terms and corresponding term weights associated with the artist name or song title are retrieved from the profile, and the terms and term weights are used to construct a sparse vector. The sparse vector is input to a training model including target data, where the target data includes a subset of test data which has a correspondence to a predetermined target metric of data (e.g., demographic data). In turn, a respective binary value and confidence level is output for each term, corresponding to an association between the term and the target metric. In that regard, the value does not need to be binary. For example, regression can be performed with a class such as "income" or "age" on a 0 . . . 1 scale with truth vectors having explicit numbers instead of a binary yes/no.

In more detail, in step 501, an artist or song title is obtained from a taste profile. While the disclosure herein may refer to a single artist or song title for purposes of conciseness, it should be understood that the demographic prediction might often be from multiple artists or song titles. For example, in one embodiment, the demographic data may be predicted for all of the artists or song titles in a taste profile or across multiple taste profiles.

A taste profile is a representation of musical activity, and includes a wide range of information such as playlists, play counts, start/stop/skip data for portions of a song or album, contents of collections, user rankings, preferences, or mentions, etc. A taste profile can represent a single user or a multiple users. Conversely, a single user or entity can have multiple taste profiles. For example, one profile could be generated in connection with a user's song play activity, whereas another separate profile for the same user could be generated based on the user's selection of songs/artists for a playlist, among others. Moreover, publicly available data can be tied to the taste profile. For example, social media sites can be examined to create anonymous users and anonymous taste profiles.

Returning to FIG. 5, in step 502, terms and weights associated with each artist or title in the taste profile are retrieved. A database may store a wide range of terms associated with each artist name or song title. For example, one example embodiment might include over 10,000 terms for each artist and associated weights, based on how important, how often mentioned or how closely related the term is to the artist, including location, genre and style, biography, recent news articles, time-dependent popularity and familiarity data, cultural analysis data, and son on. For example, the artist "Beyonce" might be associated with a vector of terms including "fast tempo", "R&B", "sexy" etc., with corresponding weights of 4.5, 4.2 and 2.5. Additional information regarding generation of terms and weights can be found in U.S. Pat. No. 7,772,478, entitled "Understanding Music", the contents of which are incorporated by reference herein. By tapping into a larger amount of data associated with the artist or song names, it is ordinarily possible to predict more accurately than just using, for example, the song title alone. In particular, as discussed above, the usage of a song, artist, movie, etc. in a taste profile to determine predictive qualities can be enhanced by expanding these media items into descriptive terms and using those terms as the inputs to the predictive model.

In step 503, a sparse vector is constructed based on the obtained terms and weights. In particular, each non-zero term corresponding to the artist or song title (or each artist or song title, if there are multiple) is combined to form a vector, with each dimension of the vector being a retrieved term, e.g., "sexy". Thus, in one aspect, the taste profile includes multiple artists or song titles, and the sparse vector is constructed from all of the terms in the musical data set corresponding to all artists or songs in the taste profile. As such, from one perspective, the sparse vector represents an entity's (e.g., a user's) musical identity. All non-zero terms across all artists in the taste profile are combined to form the vector. In one embodiment, if terms overlap between artists, e.g., both Beyonce and Michael Jackson correspond to "R&B", the weight of that term can be increased by, for example, adding the individual weights together for that term, by multiplying the probabilities, or by placing them in a Gaussian or other distribution and normalizing them, among other methods.

In step 504, the sparse vector is input to a training model, for example by a support vector machine (SVM). The training model is based on machine learning from ground truths from a random selection of data where target (demographic) data has been filled in and is held back during evaluation so that the evaluation task has never seen the input data before. For example, a training model might use a database of one million taste profiles, which, as mentioned above, include snapshots of detailed listening activity and artist preference, alongside other demographic data and media preference data from various publicly available sources. One half of the one million might be test data for which certain ground truths are known, i.e., person x likes classical and country music, and falls under the demographic categories of male and 25-40 years of age. In an exemplary embodiment, the test data has an even distribution of false and positive examples, e.g., half of each.

Exemplary data found in a training model is shown below, with the artist and song plays as the source data, and the remaining fields listing target demographic metrics.

| Field | Exemplary Data |
|---|---|
| Musical artist (boosted by weight) | ["Aerosmith": 10, "Lindstrom": 5, "David Bowie": 2] |
| Song plays | ["Band on the Run": 14, "Fire": 3, "Stairway to Heaven": 9] |
| Gender | male, female, unknown, not specified, etc |
| Movie preference | ["Stalker", "Until the end of the world", "The Rock"] |
| Book preference | ["Vineland", "The Tin Drum", "The Girl With the Dragon Tattoo"] |
| Locale | US, UK, Georgia, Hillsdale, NJ, 02141, etc |
| Music service type | Spotify, iTunes, Rdio, MOG, none, etc |
| Political figure or party | Democrat, Republican, Ron Paul, Mitt Romney, etc |
| Age | 18, 45, unknown, etc |
| Marital status | married, single, etc |

Many more fields can be collected or generated as training data, such as, for example, sports affinity, food and beverage brand types mentioned (e.g., in a social media profile), video game console or game preference, college/university, and so on. For these taste profiles used in the learning model, there is ordinarily little or no need to collect names or any other directly identifiable information. Thus, for example, each taste profile may be anonymized and given an ID and any other demographic or media preference data can be stored elsewhere linked to the taste profile.

Of course, depending on the taste profiles used as the test data, not every taste profile need have a full complement of target data. For example, while almost all taste profiles may include some locale data, perhaps only 90% might include gender, only 40% might include media preference, only 10% might include music service, only 20% might include political, and only 60% might include age. As discussed below, therefore, the F1 measure for accuracy can be used for evaluation, whereas sampling bias can be reduced in the classifier by choosing an equal amount of pro/con (positive/negative) examples during training. For example, if only 10% include a music service, the test data can use 20% of usual.

Thus, the test data can comprise a set of data determined to be associated with the target metric, as a ground truth for the learning model. The learning model trains on these ground truths, and then predicts demographics for new (input) taste profiles based on the model. Each target metric (e.g., male gender) is treated as a binary classification with multiple buckets each being a separate classifier, although regression is possible for certain classes (age, location) to get mean absolute error (MAE) instead of an F1 measure. The training model may use support vector machines (SVM) to train a model of profiles to a class output. For example, multiple instances of a taste profile can be used, and a non-linear distance function (e.g., the kernel method) can be used as a target function. The value of the evaluation kernel for new data is the "score" for the affinity between a new taste profile and the target. In the learning model, a linear SVM can be used for Vector A and a Gaussian RBF kernel SVM can be used for Vector B. Automatic regularization detection can also be used as described in U.S. Pat. No. 7,772,478.

In step 505, the training model may give an output class of 0 or 1 (positive or negative) for each input sparse vector, along with a confidence interval from the SVM classifier expressed as an absolute value. A positive output class indicates that this taste profile is part of the class predetermined in the ground truth (e.g., male gender), and the absolute value is the amount of confidence in that relation between the taste profile and the class. In some aspects, the confidence value associated with the SVM classifier could be used to filter results. For example, results or output could be filtered to only those terms with a confidence level above a set threshold. In such a case, a tradeoff between accuracy and coverage can be managed by varying the threshold.

In step 506, the artist or title (or all of the artists or titles in the sparse vector) can be evaluated as a classifier based on the output. For example, the system may examine the predictions using, for example, an F1 measure or false positive/negative rates, etc., to determine the accuracy of the prediction for a given song title or album name. The F1 measure computes a single blended measure of precision (how often the prediction was relevant) and recall (how much of the relevant data was correctly predicted). Therefore, if very few of the test set is over the age of 80, a "dumb" classifier could simply never predict that age bracket and get very high scores—F1 counters this by figuring in the statistics of the dataset. An F1 score of 1 in the evaluation of a predictive model indicates a perfect classifier or accuracy whereas an F1 of 0 is always incorrect. It can be interpreted as a probability of getting the prediction right taking sampling bias into account, and is defined as $F1=2 \cdot ((\text{precision} \cdot \text{recall})/(\text{precision}/\text{recall}))$.

The above embodiments have been generally described with respect to prediction, using a learning model trained on taste profiles with at least some ground truths.

Nevertheless, the invention is not limited to prediction based on ground truths or predetermined labels. In particular, the machine learning can also be conducted without ground truths. In such a case, clusterings (or "latent clusters") are produced instead of predictions. For example, the system may find that people that listen frequently to classical music also tend to listen earlier in the morning, people who listen for less than a minute to each song tend to not pay bills, etc. Accordingly, in such an embodiment, the output is generally a clustering of behavioral data. Put another way, it is ordinarily possible to cluster a taste profile representative of all the music activity of one or more users into, for example, taste groups (e.g., 80s, country, R&B) or affinity groups (e.g., influencer, hipster, mainstream).

Taste profiles can be clustered into useful buckets using an unsupervised method, i.e., one without predetermined ground truths. This method inputs a large set of taste profile data and uses an unsupervised clustering approach that creates k new buckets to place new data in (with k being chosen beforehand). Unsupervised clustering finds latent variables in data, and may show new ways of categorizing an audience, although the buckets are not labeled in any necessarily understandable way.

Thus, in another example embodiment, latent taste clusters are generated from taste profile data corresponding to one or more anonymous users and including at least an artist name or a song title. An artist name or a song title is obtained from a taste profile stored in taste profile data corresponding to one or more anonymous users. There is an index into a musical data set based on the artist name or the song title, and a set of terms and corresponding weights associated with the artist name or the song title are retrieved. A sparse vector is constructed based on the terms and term weights. The sparse vector is input to a clustering procedure, and one or more latent taste clusters are output based on the clustering.

A taste clustering prediction procedure such as that mentioned above could operate on the same data as for the demographic prediction procedure, with the exception that there is no ground truth (i.e., no training data is required). The clustering procedure could comprise, for example, K-means or Latent Dirichlet Allocation (LDA) clustering trained on taste profile data to represent hidden variables in the group of profile data. The results can be evaluated, for example, by seeing how cleanly the generated clusters maintain divisions, such as whether folk music and rock music remained neatly segregated between clusters.

FIGS. 6A to 6G are representative views of results from predicting demographic data according to example embodiments.

Figure 6A:
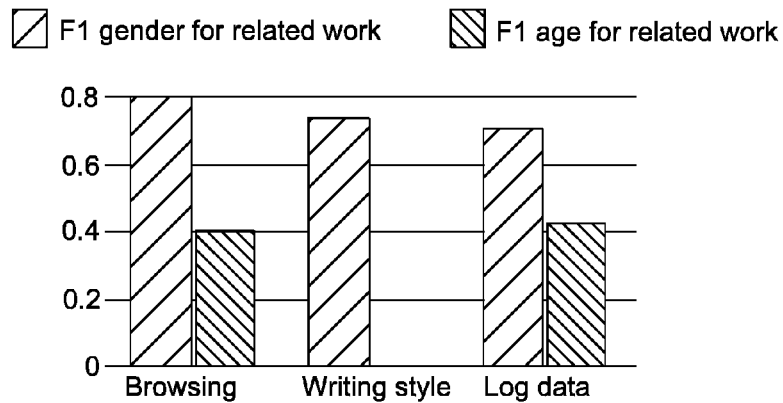
FIGS. 6A-6G are representative views of results from predicting demographic data according to example embodiments.
Figure 6B:
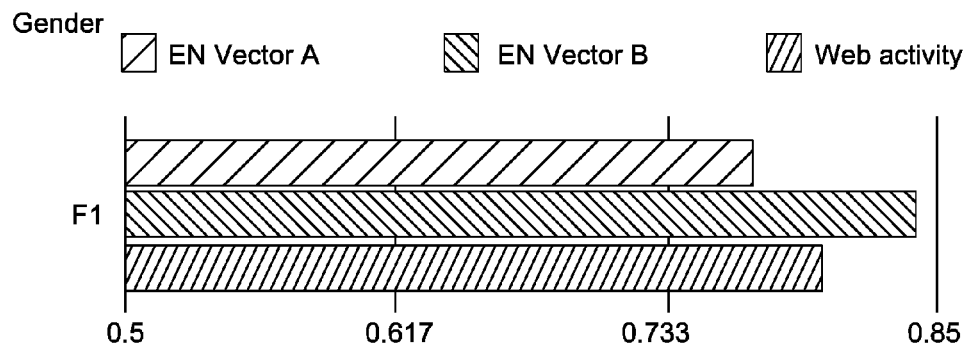
Figure 6C:
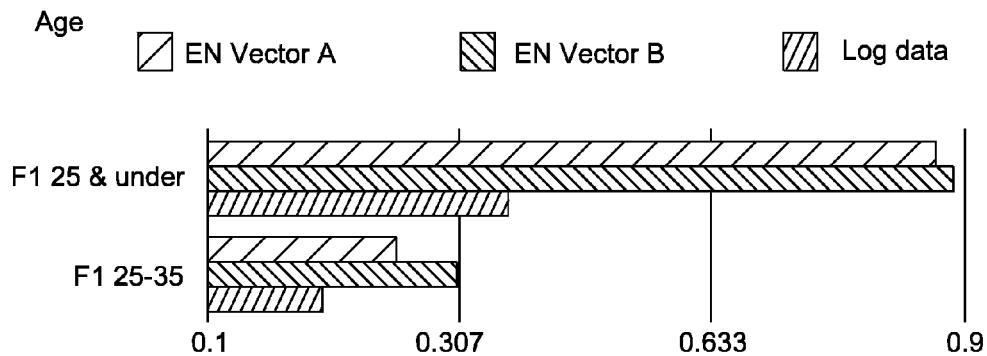
Figure 6D:
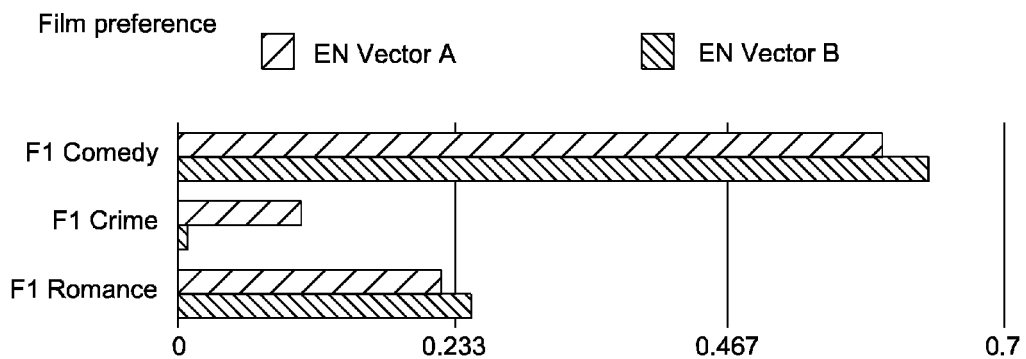
Figure 6E:
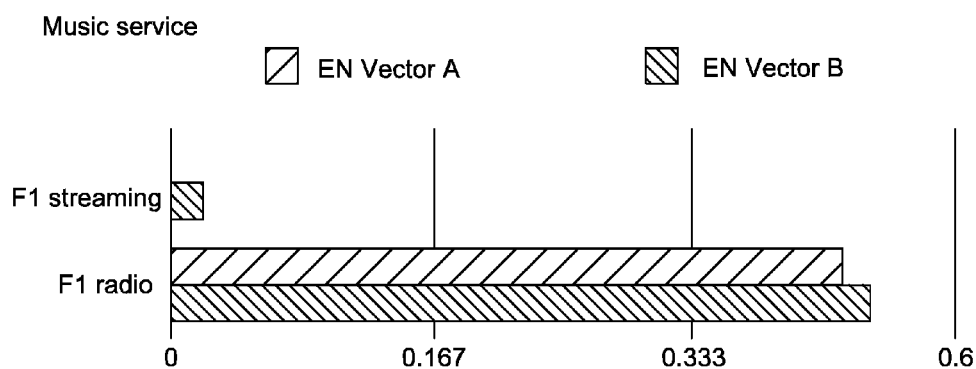
Figure 6F:
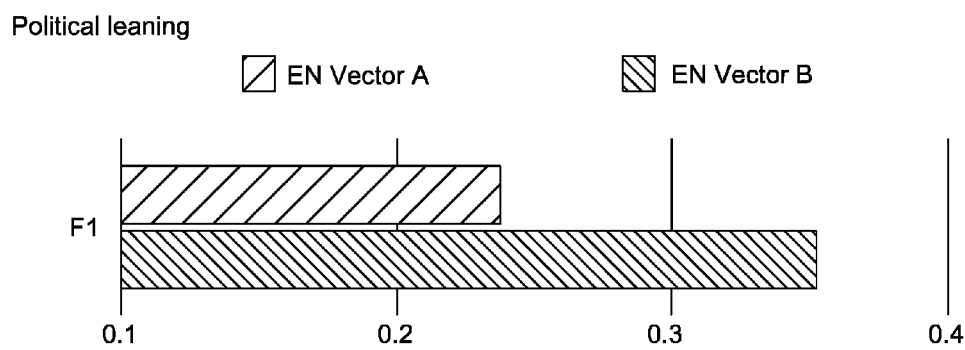
Figure 6G:
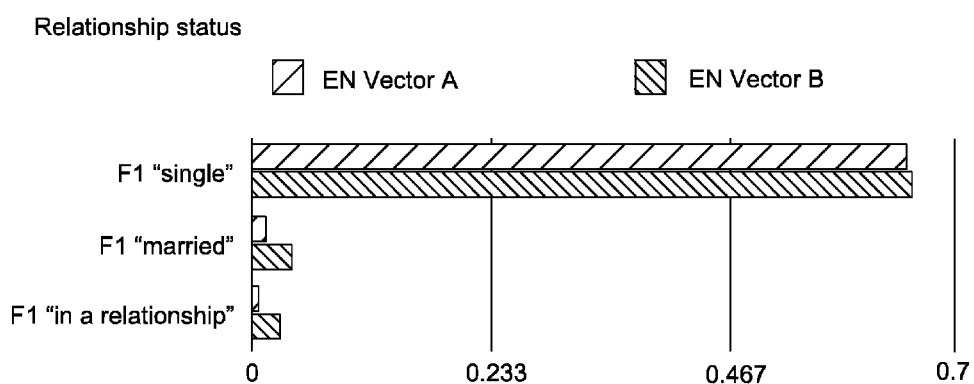

FIG. 6A shows demographic data predicted based on simple data. For example, as shown in FIG. 6A, age bracket and gender can be predicted from web browsing data, e.g., sites visited and the content of the sites visited, reaching F1 scores of 0.8 for gender and 0.4 for age bracket. Meanwhile, predicting gender from writing style on movie reviews reaches an accuracy of about 73%. In still another example, log material such as page title and IP address is matched against registration data from a news website, yielding a break-even point of 0.7 for gender and 0.42 for age bracket.

FIGS. 6B to 6G depict various sample outcomes according to example embodiments of the invention.

In FIGS. 6B to 6G, Vector A is a vector based merely on the words making up the names of artists or songs that a user has listened to, and is shown for comparison with the more robust Vector B. Vector B corresponds to the more robust sparse vector discussed above, namely, based on a database storing, e.g., over 10,000 terms for each artist and/or song, along with associated weights.

More specifically, FIGS. 6B to 6G depict the differences between two vectors of each taste profile representing the music listening as the input to the training model. Vector A is a "bag of words" term approach where every song or artist either exists or does not exist. For example, anonymous user X is represented as ["Aerosmith":1, "Beyonce":1, "Barbra Streisand":1]. Any artist the user did not mention or listen to is not included and assumed to be 0.

Meanwhile, Vector B takes far more data for all of those artists and songs and arranges it in a far more descriptive set of musical data, including genre descriptors, similar artists, words used to describe the artists and songs, popularity, and so on. The vector B data is composed of a combination of artist data with weights with term data from cultural analysis as described above and in U.S. Pat. No. 7,772,478.

As mentioned above, in the learning model, a linear SVM can be used for Vector A and a Gaussian RBF kernel SVM can be used for Vector B. Automatic regularization detection can also be used as described in U.S. Pat. No. 7,772,478.

For each target type (age, gender, etc), FIGS. 6B to 6G depict accuracy on the vector A approach and the vector B approach, alongside (in some cases) other methods. Some target types such as movie and book preference require bucketing into genre/style specific clusters.

For gender (FIG. 6B), with more music data a significant boost in prediction quality can be seen. For example, according to this example, gender can be predicted with an F1 of 0.84 using the extended musical features.

Age predictions (FIG. 6C) were bracketed into "25 and under" and then "25 to 35." While simple music listen data handily beats a log data analyzer, the extended data does even better at an F1 of 0.88.

For the film preference task (FIG. 6D) movies were bucketed into genre and chose to predict the top 3 movie genres found in the set: comedy, romance and crime. The F1 score shows the accuracy of preference prediction for that genre of movie based on simple music data alone (Vector A) and then with extra music data (Vector B.) It can be observed that music is a relatively good predictor of comedy movie preference, good at romance movie prediction, and not so good at crime movie prediction. On the other hand, the extra musical data may not help the crime movie prediction task as much in this example, possibly because distribution of crime movie preference bridges across music taste.

The music service task (FIG. 6E) looked at anonymous users who listed a preference for a music service like Spotify, Rdio, Rhapsody or MOG, vs. not mentioning one (or having any activity related to such a service) and then the same for radio services such as iHeartRadio or Pandora. Music preference seems to be a reliable predictor for subscribing to a radio service, but perhaps not yet for a streaming service. The Vector A approach on streaming received an F1 of 0.

For prediction of political leaning (FIG. 6F), preferences were examined for political figures or parties—e.g., if a user's taste profile listed "Barack Obama", the profile is placed in the "democratic" bucket, or if they listed the Democratic party as a membership or social media "like" or mention. Likewise, mention of prominent Republican figures or the party placed them in the "republican" bucket. This experiment was set up as a binary decision tree so the score represents accuracy of predicting a self-selected party affinity in the reductive case of having to choose between two parties. The system achieved a respectable F1 of 0.351 predicting this purely on our extended musical data and 0.237 on the Vector A artist data.

Relationship status (FIG. 6G) ordinarily comes from a lot of messy data from various sources. This data was cleaned as best as possible and three major buckets were identified: "single," "married" and "in a relationship." For example, "seeing someone" or "engaged" went to "in a relationship," "alone forever" went to 'single," "domestic partnership" went to "married" and so on. It can be seen that while it is difficult accurately predicting married vs. not or "in a relationship", there is better performance at predicting single (again, note that the score does take into account the very high bias of our test set mostly self reporting as "single."). In this case, additional music data being gathered may help.

Figure 7:
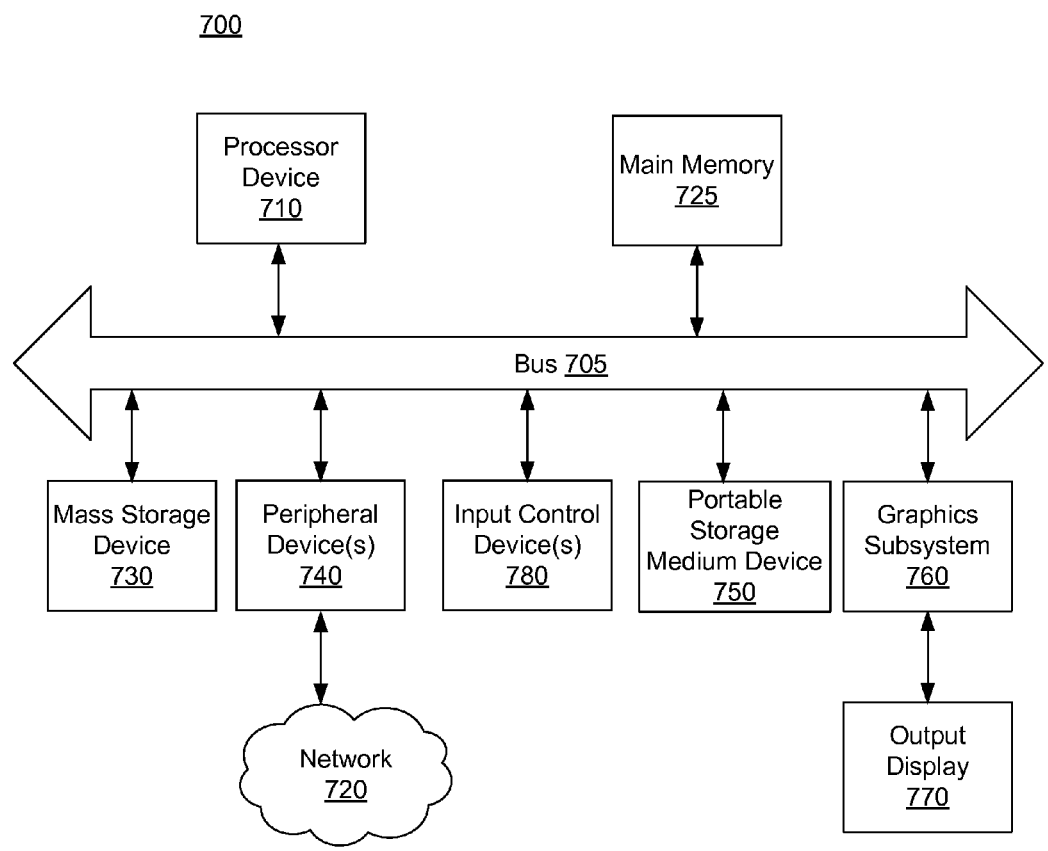
FIG. 7 is a block diagram of a device for use with various example embodiments of the invention.

FIG. 7 is a block diagram of a general and/or special purpose computer 700, which may be a general and/or special purpose computing device, in accordance with some of the example embodiments of the invention. The computer 700 may be, for example, a user device, a user computer, a client computer and/or a server computer, among other things.

The computer 700 may include without limitation a processor device 710, a main memory 725, and an interconnect bus 705. The processor device 710 may include without limitation a single microprocessor, or may include a plurality of microprocessors for configuring the computer 700 as a multi-processor system. The main memory 725 stores, among other things, instructions and/or data for execution by the processor device 710. The main memory 725 may include banks of dynamic random access memory (DRAM), as well as cache memory.

The computer 700 may further include a mass storage device 730, peripheral device(s) 740, portable non-transitory storage medium device(s) 750, input control device(s) 780, a graphics subsystem 760, and/or an output display interface 770. For explanatory purposes, all components in the computer 700 are shown in FIG. 7 as being coupled via the bus 705. However, the computer 700 is not so limited. Devices of the computer 700 may be coupled via one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 may be a nonvolatile storage device for storing data and/or instructions for use by the processor device 710. The mass storage device 730 may be implemented, for example, with a magnetic disk drive or an optical disk drive. In a software embodiment, the mass storage device 730 is configured for loading contents of the mass storage device 730 into the main memory 725.

The portable storage medium device 750 operates in conjunction with a nonvolatile portable storage medium, such as, for example, a compact disc read only memory (CD-ROM), to input and output data and code to and from the computer 700. In some embodiments, the software for storing information may be stored on a portable storage medium, and may be inputted into the computer 700 via the portable storage medium device 750. The peripheral device(s) 740 may include any type of computer support device, such as, for example, an input/output (I/O) interface configured to add additional functionality to the computer 700. For example, the peripheral device(s) 740 may include a network interface card for interfacing the computer 700 with a network 720.

The input control device(s) 780 provide a portion of the user interface for a user of the computer 700. The input control device(s) 780 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 700 may include the graphics subsystem 760 and the output display 770. The output display 770 may include a cathode ray tube (CRT) display and/or a liquid crystal display (LCD). The graphics subsystem 760 receives textual and graphical information, and processes the information for output to the output display 770.

Each component of the computer 700 may represent a broad category of a computer component of a general and/or special purpose computer. Components of the computer 700 are not limited to the specific implementations provided here.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for predicting data, comprising:
a processor configured to:
obtain a name or title from a taste profile;
index a database containing a plurality of records as inverted indices having terms that are indexes into a data set based on the name or the title, and retrieve a set of descriptive terms which assign a subjective quality to the name or the title, and corresponding term weights associated with the name or the title;
construct a sparse vector based on the set of terms and term weights wherein the sparse vector represents an identity of an entity;
input the sparse vector to a training model including target data, wherein the target data includes a subset of test data having a correspondence to a predetermined target metric of data, and
output a respective binary value and confidence level for each term above a threshold, corresponding to an association between the term and the target metric and classify the name or title based on the output.

2. The system according to claim 1, wherein the taste profile further includes one or more of the following: length of listening activity for a song, length of listening activity for an album, and user actions taken during song or album play.

3. The system according to claim 1, wherein the data set is at least one of a musical data set, a book data set, a movie data set, a game data set, or a combination thereof.

4. The system according to claim 1, wherein the processor is further configured to evaluate the name or a title as a classifier based on the output.

5. The system according to claim 1, wherein the taste profile includes multiple names or titles, and wherein the sparse vector is constructed from terms in the data set corresponding to all names or titles in the taste profile.

6. The system according to claim 1, wherein the processor is further configured to filter the output to only those terms with a confidence level above a set threshold.

7. The system according to claim 1, wherein the test data comprises a set of data determined to be associated with the target metric, as a ground truth for the learning model.

8. The system according to claim 1, wherein the processor is further configured to resolve a name or title from multiple different textual representations.

9. The system according to claim 1, wherein one entity can have multiple taste profiles, or multiple entities can share a single taste profile.

10. A method for predicting data, comprising:
obtaining a name or title from a taste profile;
indexing a database containing a plurality of records as inverted indices having terms that are indexes into a data set based on the name or the title, and retrieving a set of descriptive terms which assign a subjective quality to the name or the title, and corresponding term weights associated with the name or the title;
constructing a sparse vector based on the set of terms and term weights wherein the sparse vector represents an identity of an entity;
inputting the sparse vector to a training model including target data, wherein the target data includes a subset of test data having a correspondence to a predetermined target metric of data, and
outputting a respective binary value and confidence level for each term above a threshold, corresponding to an association between the term and the target metric and classify the name or title based on the output.

11. The method according to claim 10, wherein the taste profile further includes one or more of the following: length of listening activity for a song, length of listening activity for an album, and user actions taken during song or album play.

12. The method according to claim 10, wherein the data set is at least one of a musical data set, a book data set, a movie data set, a game data set, or a combination thereof.

13. The method according to claim 10, wherein the method further includes evaluating the name or a title as a classifier based on the output.

14. The method according to claim 10, wherein the taste profile includes multiple names or titles, and wherein the sparse vector is constructed from terms in the data set corresponding to all names or titles in the taste profile.

15. The method according to claim 10, wherein the method further includes filtering the output to only those terms with a confidence level above a set threshold.

16. The method according to claim 10, wherein the test data comprises a set of data determined to be associated with the target metric, as a ground truth for the learning model.

17. The method according to claim 10, wherein the method further includes resolving a name or title from multiple different textual representations.

18. The method according to claim 10, wherein one entity can have multiple taste profiles, or multiple entities can share a single taste profile.

19. A non-transitory computer-readable medium having stored thereon sequences of instructions, the sequences of instructions including instructions which when executed by a computer system causes the computer system to perform a method for predicting data, the method comprising:
obtaining a name or title from a taste profile;
indexing a database containing a plurality of records as inverted indices having terms that are indexes into a data set based on the name or the title, and retrieve a set of descriptive terms which assign a subjective quality to the name or the title, and corresponding term weights associated with the name or the title;

constructing a sparse vector based on the set of terms and term weights wherein the sparse vector represents an identity of an entity;

inputting the sparse vector to a training model including target data, wherein the target data includes a subset of test data having a correspondence to a predetermined target metric of data, and outputting a respective binary value and confidence level for each term above a threshold, corresponding to an association between the term and the target metric and classify the name or title based on the output.

* * * * *